United States Patent
Strater et al.

(10) Patent No.: US 11,323,282 B2
(45) Date of Patent: May 3, 2022

(54) APPARATUS, SYSTEM, METHOD, AND COMPUTER-READABLE RECORDING MEDIA FOR ONBOARDING OF A WIRELESS EXTENDER IN A WIRELESS NETWORK

(71) Applicant: ARRIS Enterprises LLC, Suwanee, GA (US)

(72) Inventors: Jay William Strater, San Diego, CA (US); Ken Haase, Pleasanton, CA (US); Gregory Nobutaka Nakanishi, San Diego, CA (US); Christophe Piel, Le Plessis-Pâté (FR)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/132,454

(22) Filed: Dec. 23, 2020

(65) Prior Publication Data

US 2021/0203524 A1 Jul. 1, 2021

Related U.S. Application Data

(60) Provisional application No. 62/955,519, filed on Dec. 31, 2019.

(51) Int. Cl.
*H04L 12/28* (2006.01)
*H04W 48/16* (2009.01)
(Continued)

(52) U.S. Cl.
CPC ......... *H04L 12/2834* (2013.01); *H04W 48/16* (2013.01); *H04W 48/20* (2013.01);
(Continued)

(58) Field of Classification Search
CPC ................................ H04W 12/50; H04W 8/26
(Continued)

(56) References Cited

U.S. PATENT DOCUMENTS 9,271,318 B2 * 2/2016 Sarikaya ................. H04W 8/26
10,057,813 B1 8/2018 Likar et al.
(Continued)

FOREIGN PATENT DOCUMENTS

WO 2016/077528 5/2016
WO 2020/132448 6/2020

OTHER PUBLICATIONS

International Search Report and the Written Opinion of the International Searching Authority dated Apr. 6, 2021 in International (PCT) Application No. PCT/US2020/066809.

*Primary Examiner* — Kiet M Doan
(74) *Attorney, Agent, or Firm* — Wenderoth, Lind & Ponack, L.L.P.

(57) ABSTRACT

An apparatus, system, method, and computer-readable recording media perform onboarding of a wireless extender in a wireless residential network. A mobile device, obtains a media access point (MAC) address or serial number from a wireless extender, and transmits to a residential gateway a request to add the wireless extender to the wireless residential network. The residential gateway performs a protected onboarding operation that includes transmitting a unique onboarding trigger SSID to the wireless extender, the unique onboarding trigger SSID including an identifier with part or all of the MAC address or the serial number from the wireless extender and being provided as a signal to initiate a standard WPS operation on the wireless extender. The wireless extender initiates the standard WPS operation for establishing a wireless backhaul link between the wireless residential network and the wireless extender.

23 Claims, 4 Drawing Sheets

(51) Int. Cl.
*H04W 48/20* (2009.01)
*H04W 84/12* (2009.01)
*H04W 88/06* (2009.01)
*H04W 92/20* (2009.01)

(52) U.S. Cl.
CPC .......... *H04W 84/12* (2013.01); *H04W 88/06* (2013.01); *H04W 92/20* (2013.01)

(58) Field of Classification Search
USPC ................ 370/259, 241, 356; 455/552.1
See application file for complete search history.

(56) References Cited

U.S. PATENT DOCUMENTS

2012/0163183 A1* 6/2012 Podlyas ................ H04W 76/12
370/241
2018/0035291 A1* 2/2018 Dowlatkhah ....... H04W 12/088
2019/0373464 A1 12/2019 Chari et al.

\* cited by examiner

APPARATUS, SYSTEM, METHOD, AND COMPUTER-READABLE RECORDING MEDIA FOR ONBOARDING OF A WIRELESS EXTENDER IN A WIRELESS NETWORK

TECHNICAL FIELD

The subject matter of the present disclosure relates generally to the onboarding of one or more wireless extenders in a wireless residential network.

BACKGROUND

Wireless residential networks having services provided by a residential gateway and wireless extenders are prevalent in many homes. Such wireless residential networks typically have one or more wireless extenders connected with an upstream access point (AP) over what is referred to as a wireless backhaul (BH) link. However, installing new wireless extenders to expand a wireless residential network can be inconvenient because it requires properly configuring and securely associating the new wireless extender with the BH service set identifier (SSID) of the wireless residential network, which is typical hidden.

There are possible approaches to what is referred to as "onboarding" (i.e., provisioning) a new wireless extender in a wireless residential network. For example, a user can be provided with an application on their mobile phone that uses Bluetooth Low Energy (BLE) communication as an out-of-band channel with a home network device and a new wireless extender to provision the new wireless extender with its BH information (e.g., SSID). Additionally, a user can physically push wireless protected setup (WPS) buttons on a new wireless extender and a home network device to have the home network device provision the new wireless extender with its BH information (e.g., SSID).

However, all the possible approaches for onboarding a new wireless extender mentioned above have drawbacks. A BLE solution requires BLE support for home network devices and mobile devices having applications. Additionally, the WPS solution requires a user to physically push a WPS button on devices, which could be located in different rooms of the home.

Thus, it would be advantageous and an improvement over the relevant technology to provide an apparatus, system, method, and program that is capable of onboarding a new extender to a residential network while avoiding the need for BLE support for home network devices, and the requirement to physically push buttons on home network devices.

SUMMARY

Embodiments described in the present disclosure provide methods for performing the onboarding of a wireless extender in a wireless residential network, the wireless residential network including at least a residential gateway and a mobile device connected to the residential gateway.

A method according to an embodiment of the present disclosure includes obtaining, using the mobile device, a media access point (MAC) address or serial number from the wireless extender, and transmitting, using the mobile device, a request to the residential gateway to add the wireless extender to the wireless residential network, the request including the MAC address or serial number obtained from the wireless extender.

The method includes initiating, using the residential gateway, a protected onboarding operation that includes transmitting a unique onboarding trigger SSID to the wireless extender, the unique onboarding trigger SSID including an identifier with part or all of the MAC address or the serial number from the wireless extender; and detecting, using the wireless extender, the unique onboarding trigger SSID, the unique onboarding trigger SSID being provided as a signal to initiate a standard wireless protected setup (WPS) operation on the wireless extender.

Additionally, the method includes initiating, using the wireless extender, the standard WPS operation for establishing a wireless backhaul link between the wireless residential network and the wireless extender. The wireless backhaul link can be between the residential gateway and the wireless extender, or between an existing wireless extender and the wireless extender. The obtaining of the MAC address or serial number from the wireless extender includes, for example, scanning a barcode or quick response (QR) code on the wireless extender.

A method according to an embodiment of the present disclosure includes transmitting, using each of one or more existing wireless extenders, a unique onboarding trigger SSID beacon signal to the wireless extender, each of the unique onboarding trigger SSID beacon signals including part or all of the MAC address or the serial number of the wireless extender and a MAC address and a serial number of the respective existing wireless extender transmitting the unique onboarding trigger SSID beacon signal.

The method includes detecting, using the wireless extender, a strongest signal received among the residential gateway and the one or more existing wireless extenders based on the unique onboarding trigger SSID beacon signals, wherein the wireless extender and residential gateway or an existing wireless extender having the strongest signal initiate the standard WPS operation for establishing the wireless backhaul link between the wireless residential network and the wireless extender.

An embodiment described in present disclosure provides a system for onboarding a wireless extender in a wireless residential network including a mobile device having a user interface, a camera, at least one hardware processor, a non-transitory memory storing onboarding software, and a first network interface configured to establish a connection to the wireless residential network using a first network connection.

The system includes a residential gateway having at least one hardware processor, a non-transitory memory storing onboarding software, and a network interface configured to establish a connection to the mobile device using the first network connection and configured to establish a connection to the wireless residential network using a second network connection; and a wireless extender to be added to the residential network including a least one hardware processor, a non-transitory memory storing onboarding software, and a network interface for connecting to the residential gateway using the second network connection.

The mobile device obtains, using the camera or the user interface, a media access point (MAC) address or serial number from the wireless extender, and transmits using the first network connection a request to the residential gateway to add the wireless extender to the wireless residential network, the request including the MAC address or serial number obtained from the wireless extender.

The residential gateway initiates a protected onboarding operation that includes transmitting a unique onboarding trigger SSID to the wireless extender using the second network connection. The wireless extender detects the unique onboarding trigger SSID, and initiates the standard WPS operation for establishing a wireless backhaul link between the wireless residential network and the wireless extender using the second network connection.

An embodiment described in the present disclosure provides an apparatus for onboarding to a wireless residential network, wherein the at least one hardware processor executes onboarding software to perform an onboarding operation. The apparatus detects a unique onboarding trigger SSID received using the network connection and initiates the standard WPS operation for establishing a wireless backhaul link to the wireless residential network, and establishes the wireless backhaul link with the wireless residential network. The wireless backhaul link with the wireless residential network is established with a residential gateway or with an existing wireless extender having a strongest unique onboarding trigger SSID beacon signal.

An embodiment described in the present disclosure provides a non-transitory computer-readable recording medium in each of the residential gateway, one or more wireless extenders including the wireless extender to be added to the wireless residential network, and the mobile device for performing onboarding of the wireless extender in the wireless residential network. Each non-transitory computer-readable recording medium stores one or more programs which when executed by a respective processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
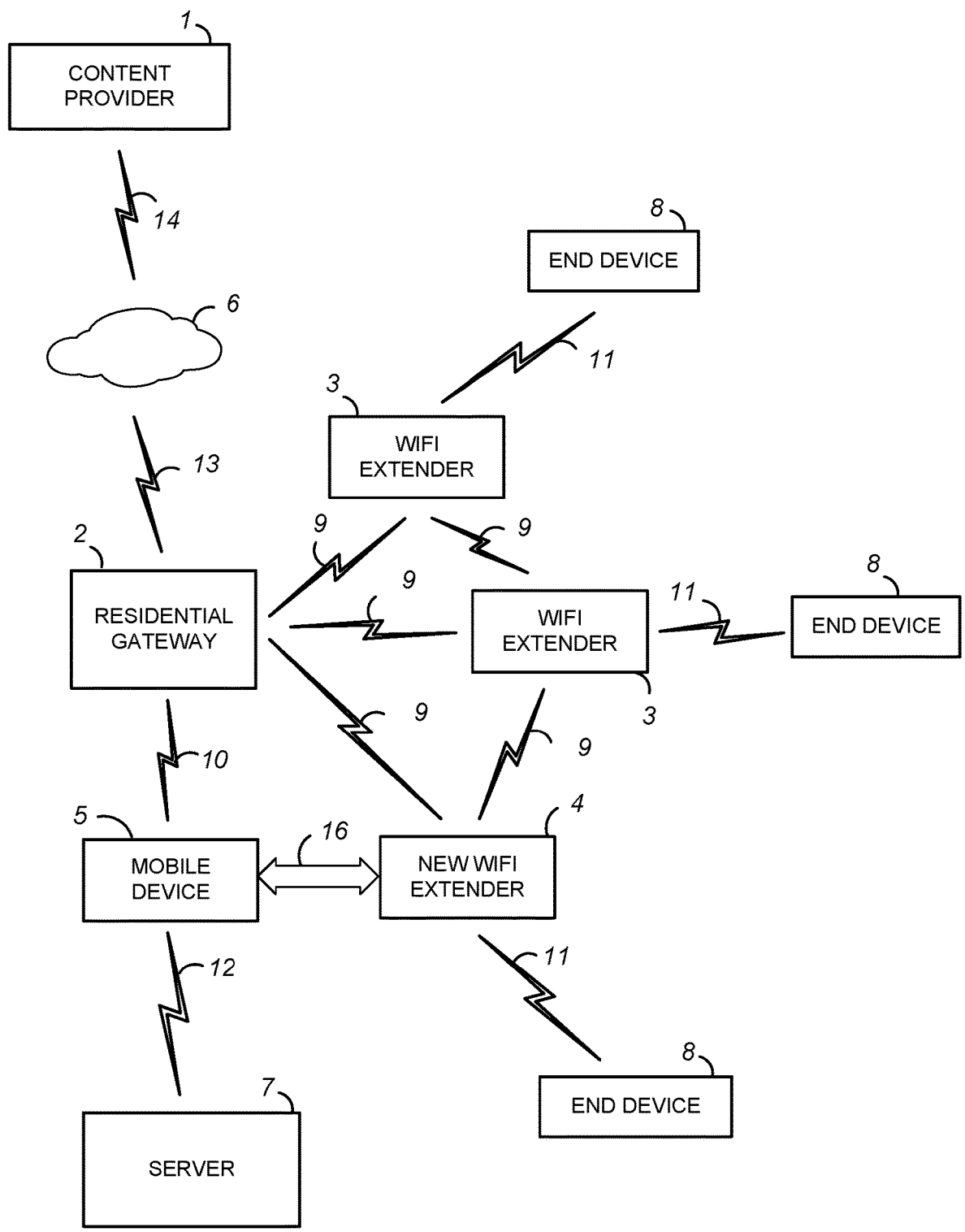
FIG. 1 is a schematic diagram of a system for onboarding a wireless extender in a wireless residential network according to an embodiment of the present disclosure.

FIG. 1 is a schematic diagram of a system for onboarding a new wireless extender in a wireless residential network according to an embodiment of the present disclosure. As shown in FIG. 1, the system includes a residential gateway 2 connected to one or more wireless extenders 3, 4 for providing services (e.g., content) to one or more end devices 8. The residential gateway 2 is also connected to a content provider 1 via an Internet 6 and to a mobile device 5.

The content provider 1 may be a cable television provider, a satellite television provider, an internet service provider, or multiple system operators. The residential gateway 6 is a hardware electronic device that acts as a router for providing content received from the content provider 1 to the home network devices (e.g., end devices) in the wireless residential network. The connection 14 between the Internet 6 and the content provider 1 can be implemented using a wide area network (WAN), a virtual private network (VPN), metropolitan area networks (MANs), system area networks (SANs), a public switched telephone network (PTSA), a global Telex network, or a 2G, 3G, 4G or 5G network.

The connections 13 between the residential gateway 2 and the Internet 6 can be implemented using a DSL connection, cable modem, a broadband mobile phone network, an optical network, or other similar connections. It is also contemplated by the present disclosure that the residential gateway 2 is capable of providing connections between the wireless residential network and a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network using connection 13.

The wireless extenders 3, 4 are hardware electronic devices that are used to extend the wireless residential network by receiving the signals transmitted by the residential gateway 2 and rebroadcasting the signals to the end devices 8, which may out of range of the residential gateway 2. The wireless extenders 3, 4 also receive signals from the end devices 8 and rebroadcast the signals to the residential gateway 2. It is contemplated by the present disclosure that the residential gateway 2 can also communicate directly with the end devices 8 using connection 9, instead of going through a wireless extender 3, 4. The connections 9 between the residential gateway 2 and the wireless extenders 3, 4, (and possibly the end devices 8), and between the different wireless extenders 3, 4 are implemented using a wireless connection that operates in accordance with, but is not limited to, IEEE 802.11 protocol.

The connection 11 between the wireless extenders 3, 4 and the end devices 8 are also implemented through a wireless connection that operates in accordance with, but is not limited to, IEEE 802.11 protocol. The connection 11 between the wireless extenders 3, 4 and the end devices 8 can also be a wireless connection that operates in accordance with a Bluetooth protocol or other short range protocols that operate in accordance with a wireless technology standard for exchanging data over short distances using short-wavelength Ultra high frequency (UHF) radio waves from 2.4 to 2.485 GHz.

The end devices 8 are, for example, client devices that include, but are not limited to, a computer, a portable device, an electronic tablet, a smart phone, smart speakers, or other wireless hand-held consumer electronic device capable to executing and displaying the content received through the residential gateway 2 and the wireless extenders 3, 4. The mobile device 5 is any handheld computer, smartphone, electronic tablet, e-reader, personal digital assistant (PDA), or portable music players with smart capabilities that is capable of connecting to the Internet, cellular networks, and interconnect with other devices via Wi-Fi and Bluetooth. The connection 10 between the residential gateway 2 and the mobile device 5 is implemented through a wireless connection that operates in accordance with, but is not limited to, IEEE 802.11 protocol. It is also contemplated by the present disclosure that the mobile device 5 can be connected indirectly with the residential gateway 2 via a wireless extender 3, 4.

The connection 10 between the residential gateway 2 and the mobile device 5 can also be implemented through a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network.

As shown in FIG. 1, there is also a data connection 16 established between the new wireless extender 4 and the mobile device 5 for obtaining information from the wireless extender 4. The data connection 16 is implemented using, for example, a camera of the mobile device 5 to scan information such as a barcode or quick response (QR) code on the new wireless extender 4. The mobile device 5 obtains information from the new wireless extender 4 for the onboarding the new wireless extender 4 in the wireless residential network.

The server 7 is, for example, the gateway's Dynamic Host Configuration Protocol (DHCP) server, the gateway's domain name system (DNS), mobile network server, software module, or other similar computing device capable of receiving, storing, and managing IP addresses, default gateways, and DNS settings. In FIG. 1, the server 7 is shown as a separate device. However, it is also contemplated by the present disclosure that the server 7 can reside in the residential gateway 2.

The connection 12 between the mobile device 12 and the server 7 is a connection implemented using a telephone network, the Internet, a computer network, a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network.

Figure 2:
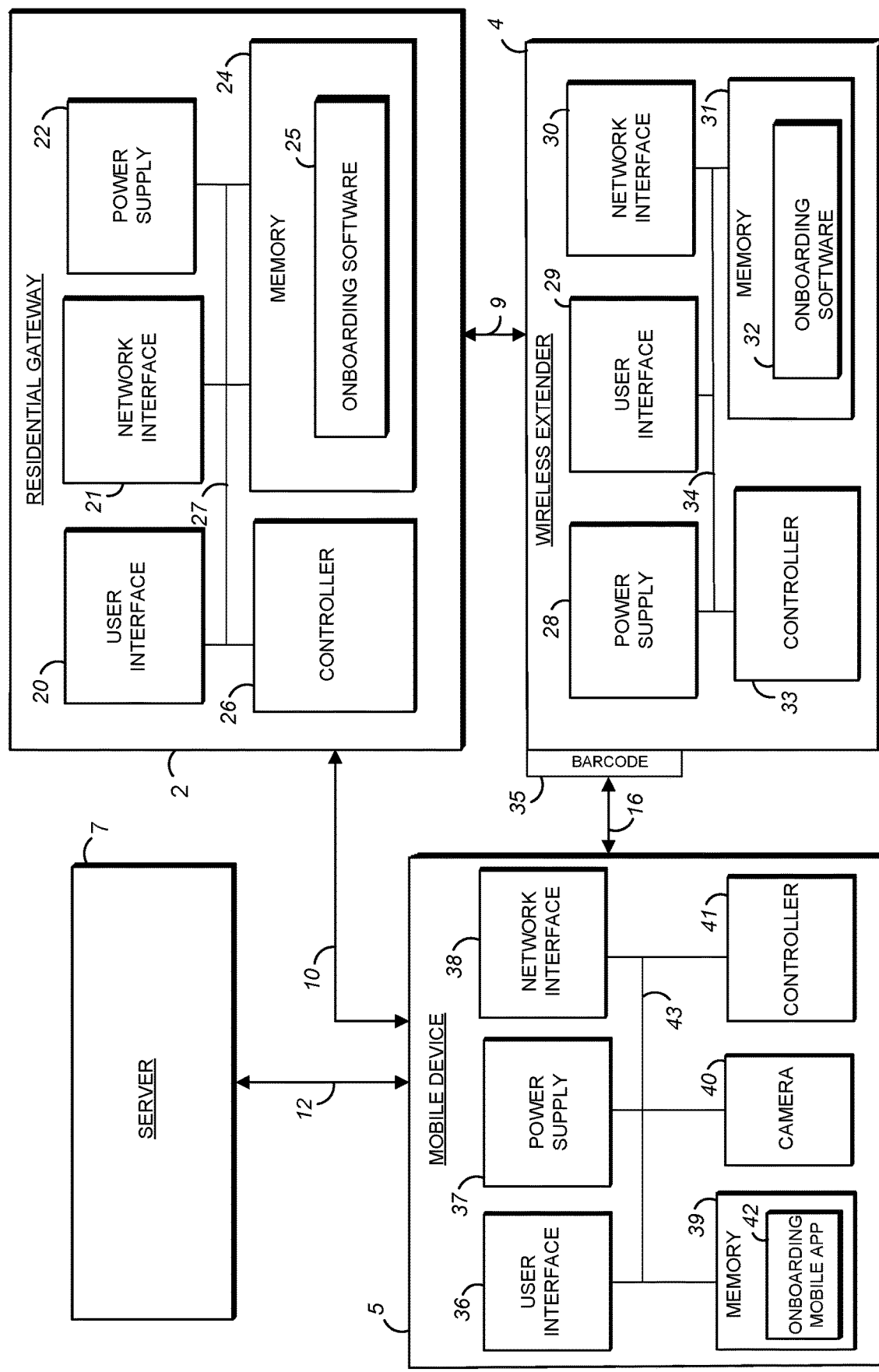
FIG. 2 is a more detailed schematic diagram of a system for onboarding a wireless extender in a wireless residential network according to an embodiment of the present disclosure.

A detailed description of the exemplary internal components of the residential gateway 2, wireless extender 3, 4, and mobile device 5 shown in FIG. 1 will be provided in the discussion of FIG. 2. However, in general, it is contemplated by the present disclosure that the residential gateway 2, the wireless extenders 3, 4 and the mobile device 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the residential gateway 2, the wireless extenders 3, 4, and the mobile device 5 may be adapted to execute any operating system, including Linux, UNIX, Windows, MacOS, DOS, and ChromOS as well as virtual machines adapted to virtualize execution of a particular operating system, including customized and proprietary operating systems. The residential gateway 2, the wireless extenders 3, 4, and the mobile device 5 are further equipped with components to facilitate communication with other computing devices over the one or more network connections to local and wide area networks, wireless and wired networks, public and private networks, and any other communication network enabling communication in the system.

FIG. 2 illustrates a schematic diagram of a system for onboarding a wireless extender in a wireless residential network according to an embodiment of the present disclosure. FIG. 2 provides a more detailed description of the exemplary internal components of the residential gateway 2, an exemplary wireless extender 3, 4 and the mobile device 5 shown in FIG. 1. Although FIG. 2 only shows the new wireless extender 4, the new wireless extender 4 is meant to be representative of all the wireless extenders 3, 4 in the wireless residential network.

The server 7 is, for example, the gateway's Dynamic Host Configuration Protocol (DHCP) server, the gateways' domain name system (DNS), mobile network server, software module, or other similar computing device capable of receiving, storing, and managing IP addresses, default gateways, and DNS settings. For example, IP addresses can be obtained from the server 7 so that the new wireless extender 4 can determine the residential gateway's HTTPS server address from communication with the residential gateway 2 prior to being fully onboarded to the wireless residential network. A URL for the HTTPS server address on the residential gateway 2 used in the residential gateway's onboarding communication can be resolved via a DNS server as well (e.g., in network or on the residential gateway like the DHCP server).

The mobile device 5 is any handheld computer, smartphone, electronic tablet, e-reader, personal digital assistant (PDA), or portable music players with smart capabilities that is capable of connecting to the Internet, cellular networks, and interconnect with other devices via Wi-Fi and Bluetooth. The mobile device 5 includes a user interface 36, a power supply 37, a network interface 38, a memory 39, a camera 40, and a controller 41. The user interface 36 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the mobile device 5. The power supply 37 supplies power to the internal components of the mobile device 5 through the internal electrical bus 43. The power supply 37 includes a self-contained power source such as a battery pack with an interface to be powered through an electrical charger connected to an outlet (e.g., either directly or by way of another device). The power supply 37 can also include a rechargeable battery that can be detached allowing for replacement such as a nickel-cadmium (NiCd), NiMH (NiMH), a lithium-ion (Li-ion), or a lithium Polymer (Li-pol) battery.

The network interface 38 includes various network cards, interfaces, and circuitry implemented in software and/or hardware to enable communications with the residential gateway 2 using connection 10 and with the server 7 using connection 12. The various network cards, interfaces, and circuitry enable communications via connection 10 using a wireless connection that operates in accordance with, but is not limited to, IEEE 802.11 protocol. The connection 10 between the residential gateway 2 and the mobile device 5 using the network interface 38 can also be implemented through the Internet, a computer network, a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network.

The various network cards, interfaces, and circuitry of the network interface 38 enable communications via connection 12 using a telephone network, the Internet, a computer network, a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network. The memory 39 includes a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy.

The memory 39 can be used to store any type of instructions including onboarding software such as the onboarding mobile application 42 associated with algorithms, processes, or operations for controlling the general functions and operations of the mobile device 5 and the onboarding operations for the new wireless extender 4. The camera 40 is a standard camera of a camera phone that is able to capture photographs and record video. The camera 40 can be used in combination with a scanning application stored in the memory 39 for obtaining information from the new wireless extender 4 through the data connection 16. For example, using the data connection 16, the camera of the mobile device 5 can scan information such as a barcode or quick response (QR) code on the new wireless extender 4.

The controller 41 controls the general operations of the mobile device 5 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the mobile device 5. Communication between the components (e.g., 36-41) of the mobile device 5 is established using the internal electrical bus 43.

The residential gateway 2 is a hardware electronic device that acts as a router for providing content received from the content provider 1 to the home network devices (e.g., end device 8) in the wireless residential network. The residential gateway 2 includes a user interface 20, a network interface 21, a power supply 22, a memory 24, and a controller 26. The user interface 20 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the residential gateway 2. The network interface 21 includes various network cards, and circuitry implemented in software and/or hardware to enable communications with the wireless extender 4 using connection 9 and the mobile device using connection 10. The various network cards, interfaces, and circuitry of the network interface 21 enable communications via connection 9 using a wireless protocol in accordance with, but is not limited to, IEEE 802.11 protocol.

The various network cards, interfaces, and circuitry of the network interface 21 enable communications via connection 10 to the mobile device 5 using a wireless protocol that operates in accordance with, but is not limited to, IEEE 802.11 protocol. The connection 10 between the residential gateway 2 and the mobile device 5 using the network interface 21 can also be through the Internet, a computer network, a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network.

The power supply 22 supplies power to the internal components of the residential gateway 2 through the internal electrical bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a nickel-cadmium (NiCd), NiMH (NiMH), a lithium-ion (Li-ion), or a lithium Polymer (Li-pol) battery.

The memory 24 includes a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy. The memory 24 can be used to store any type of instructions including onboarding software 25 associated with algorithms, processes, or operations for controlling the general functions and operations of the residential gateway 2 for performing onboarding operations of the new wireless extender 4.

The controller 26 controls the general operations of the residential gateway 2 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the residential gateway 2. Communication between the components (e.g., 20-22, 24, and 26) of the residential gateway 2 is established using the internal electrical bus 27.

The wireless extender 4 is a hardware electronic device that is used to extend the wireless residential network. The wireless extender 4 includes a power supply 28, user interface 29, network interface 30, a memory 31, and a controller 33. The power supply 28 supplies power to the internal components of the wireless extender 4 through the internal electrical bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), NiMH (NiMH), a lithium-ion (Li-ion), or a lithium Polymer (Li-pol) battery. The user interface 29 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the wireless extender 4.

The network interface 30 includes various network cards, interfaces, and circuitry implemented in software and/or hardware to enable communications with the residential gateway 2 and other wireless extenders 3 in the network via connection 9 using a wireless protocol that operates in accordance with, but is not limited to, IEEE 802.11 protocol. The network interface 30 also includes software and/or hardware to enable communications with the end devices 8 via connection 11 using a wireless connection that operates in accordance with a Bluetooth protocol or other short range protocols that operate in accordance with a wireless technology standard for exchanging data over short distances using short-wavelength Ultra high frequency (UHF) radio waves from 2.4 to 2.485 GHz.

The memory 31 includes a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy. The memory 31 can be used to store any type of instructions including onboarding software 32 associated with algorithms, processes, or operations for controlling the general functions and operations of the wireless extender 4 and the onboarding operations.

The controller 33 controls the general operations of the wireless extender 4 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the mobile device 5. Communication between the components (e.g., 28-31 and 33) of the wireless extender 4 is established using an internal bus 34.

As shown in FIG. 2, the wireless extender 4 includes the use of a barcode or QR code 35, which can be in the form of a label attached to the outside of the wireless extender 4 and includes data and information about that wireless extender 4. For example, the data and information represented by the barcode or QR code 35 may include the MAC address or serial number of the wireless extender 4.

Figure 3:
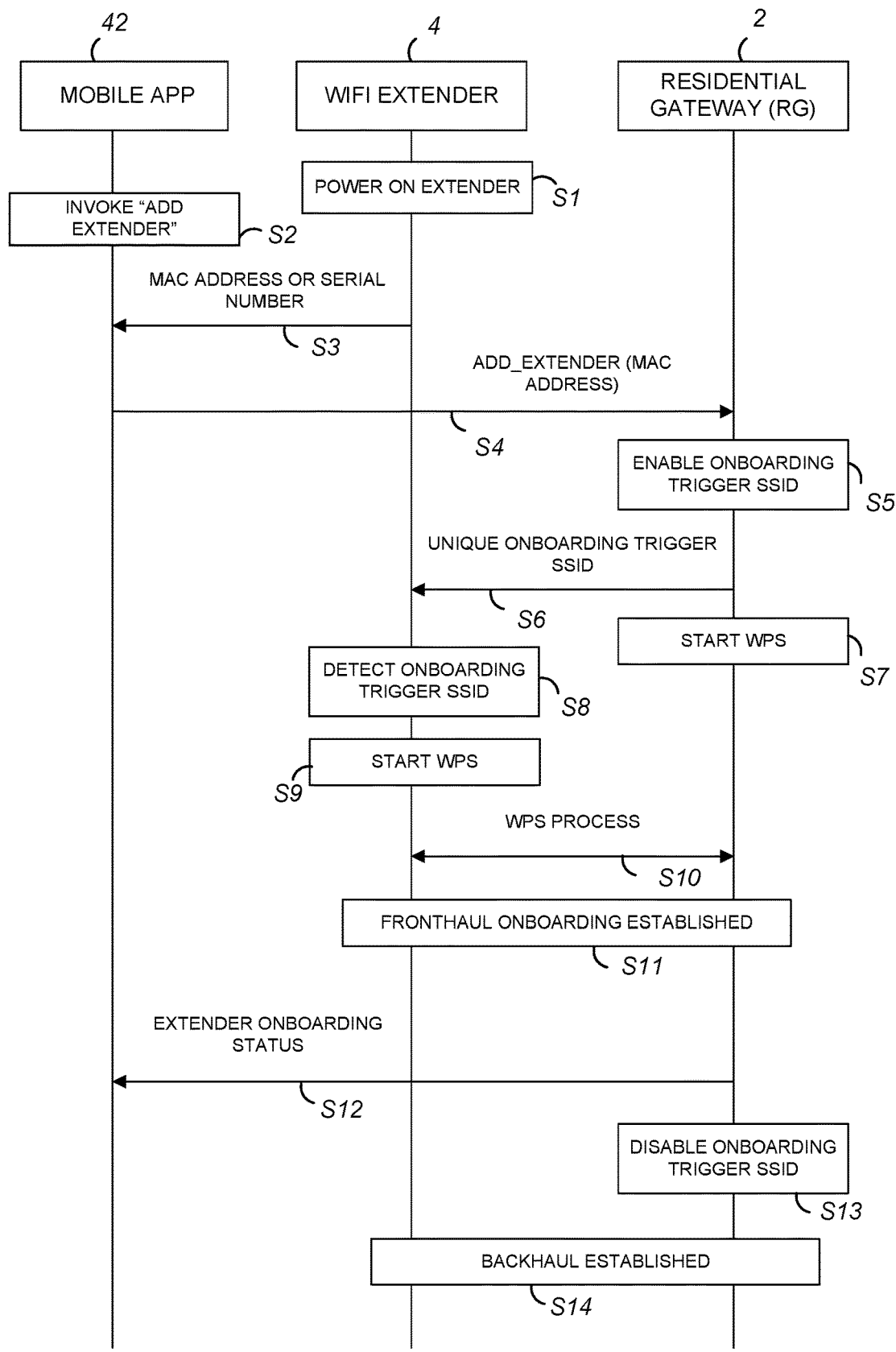
FIG. 3 illustrates a method for performing onboarding of a wireless extender in a wireless residential network according to an embodiment of the present disclosure.

FIG. 3 illustrates a method for performing onboarding of a new wireless extender in a wireless residential network according to an embodiment of the present disclosure. Prior to onboarding of the new wireless extender 4, the mobile device 5 is securely connected to the residential gateway 2, e.g., on front-haul (FH) service set identifier (SSID) (e.g. Data SSID) with password (PW) protection, using connection 10. The user also downloads and activates the mobile application 42 needed for wireless onboarding operations. Additionally, the new wireless extender 4 and the residential gateway 2 include their respective onboarding software 25, 32. In FIG. 3, the method illustrates operations between the onboarding mobile application 42 of the mobile device 5, the onboarding software 32 of the wireless extender 4, and the onboarding software 25 of the residential gateway 2 when performing onboarding of the new wireless extender 4.

In step S1, the new wireless extender 4 is turned on using the user interface 29 and the power supply 28 of the new wireless extender 4. Upon activation of the new wireless extender 4, the onboarding mobile application 32 will continually scan for the presence of any transmitted On-Board-Trigger SSIDs (e.g., beacon signals) from other devices in the wireless residential network. An On-Board-Trigger SSID is a unique unhidden SSID that includes part or all of the wireless extender's 4 unique identifier in an SSID name, which may include the MAC address or serial number (e.g., if using the extender's MAC address such as 23456789AB, the onboarding unique SSID may be Onboard_89AB) of the new wireless extender 4.

In step S2, the user of the mobile device 5 invokes the adding or onboarding of the new wireless extender 4 by making a selection using, for example, the "Add Extender" service provided through the onboarding mobile application 42 (e.g., "Add Extender" selection) using the user interface 36. In step S3, the onboarding mobile application 42 instructs the user via the user interface 36 to scan the barcode or QR 35 attached to the new wireless extender 4. The data from the barcode or QR 35 includes a MAC address or serial number (e.g., if using the extender's MAC address: 23456789AB) of the wireless extender 4.

The camera 40 can be used in combination with a scanning application stored in the memory 39 for scanning and obtaining the data from the barcode or QR 35 attached to the new wireless extender 4 (e.g., data connection 16). In step S4, the onboarding mobile application 42 uses the data obtained from the barcode or QR 35 attached to the new wireless extender 4 to generate a request for onboarding of the new wireless extender 4 and transmits the request to the residential gateway 2 using connection 10. The request transmitted from the onboarding mobile application 42, in step S4, includes the MAC address or the serial number of the new wireless extender 4 (e.g., if using the extender's MAC address: 23456789AB).

Upon receiving the request from the onboarding mobile application 42 to initiate the onboarding operation, the onboarding software 25 of the residential gateway 2 initiates a protected onboarding operation to generate and enable an On-Board-Trigger SSID in step S5. As noted above, the On-Board-Trigger SSID is a unique unhidden SSID that includes part or all of the extender's unique identifier (e.g., if using the extender's MAC address which is: 0123456789AB, the unique onboarding SSID may be Onboard_89AB). In step S6, the residential gateway 2 transmits the On-Board-Trigger SSID (e.g., as a beacon signal) to the new wireless extender 4 using connection 9.

A key aspect of the present disclosure is the use of a unique On-Board-Trigger SSID for signaling when the new wireless extender 4 is to initiate the onboarding operation. Additionally, this mitigates a security threat of the new wireless extender 4 onboarding with, for example, a rogue access point (AP) since the new wireless extender 4 will wait to onboard only after seeing the unique On-Board-Trigger SSID, which is initiated by the residential gateway 2 when the onboarding operation commences.

In step S7, the onboarding software 25 of the residential gateway 2 concurrently initiates a WPS operation using its standard SSID right after enabling and transmitting the On-Board-Trigger SSID. The onboarding software 32 of the wireless extender 4 is activated (e.g., step S1) and is continually scanning for the presence of any transmitted unique On-Board-Trigger SSIDs from other devices in the wireless residential network. The scanning by the wireless extender 4 is accomplish by the onboarding software 32 through the use of scanning logic followed by a parsing operation to look for all or part of its MAC address or SN in any of the SSID results from the scan. Depending on when the wireless extender 4 is activated and the residential gateway 2 enables the On-Board-Trigger SSID, the wireless extender 4 may need to run through several scans or scan SSID check iterations before detecting the On-Board-Trigger SSID. A manual WPS operation would also terminate the scan operation. In step S8, the onboarding software 32 of new wireless extender detects the On-Board Trigger SSID transmitted by the residential gateway 2. At this point, the onboarding software 32 of the new wireless extender 4 can also terminate its scanning for the On-Board Trigger SSID.

Once the wireless extender 4 detects the On-Board Trigger SSID, the onboarding software 32 initiates a soft WPS action on the wireless extender 4 in step S9, and a standard WPS operation occurs to establish the wireless backhaul link between the extender and residential gateway in step S10. In the WPS operation in step S10, the wireless extender 4 would use the SSID it is currently assigned for WPS, not the On-Board Trigger SSID. The On-Board Trigger SSID is only intended for triggering the WPS operation on the wireless extender 4. In step S11, the onboarding software 32 of the wireless extender 4 establishes a fronthaul onboarding connection with the residential gateway 2 using the WPS operation.

In step S12, the onboarding software 25 of the residential gateway 2 transmits an extender onboarding status message back to the mobile device 5 using connection 10. For example, the extender onboarding status message may include a "success" response back to the mobile application 42 that the new wireless extender 4 has been added to the wireless residential network, and the onboarding mobile application 42 informs the user via the user interface 36 of the mobile device 5. Alternatively, if the WPS operation fails, the onboarding mobile application 25 of the residential gateway 2 provides an "error" response back to the onboarding mobile application 42. In either case, the onboarding software 25 of the residential gateway disables the On-Board Trigger SSID because it is no longer needed, in step S13.

Assuming that the new wireless extender 4 has been added to the wireless residential network and a fronthaul onboarding connection is established, the onboarding software 32 of the residential gateway 32 and the onboarding software of the 25 on the residential gateway will perform operations to configure the backhaul SSID on the new wireless extender 4 followed by additional configuring and steering operations and backhaul onboarding is established between the new wireless extender 4 and the residential gateway 2, in step S14. On the other hand, if an "error" response was sent back to the onboarding mobile application 42 and the onboarding of the new wireless extender 4 fails, the onboarding mobile application 42 may instruct the user to move the new wireless extender 4 closer to the residential gateway 2, and provide instructions to re-attempt onboarding operations.

The above description of onboarding of a new wireless extender of the present disclosure allows for easy onboarding a new extender to a residential network while avoiding the need for BLE support for home network devices, and the requirement to physical push buttons on home network devices. The user merely scans a bar code or QR of new extender, no WPS buttons need to be pushed, and only minor wireless extender support is required. Additionally, the unique On-Board-Trigger SSID makes it difficult for a hacker device to impersonate a residential gateway, which mitigate a rouge device successfully capturing a wireless extender.

Figure 4:
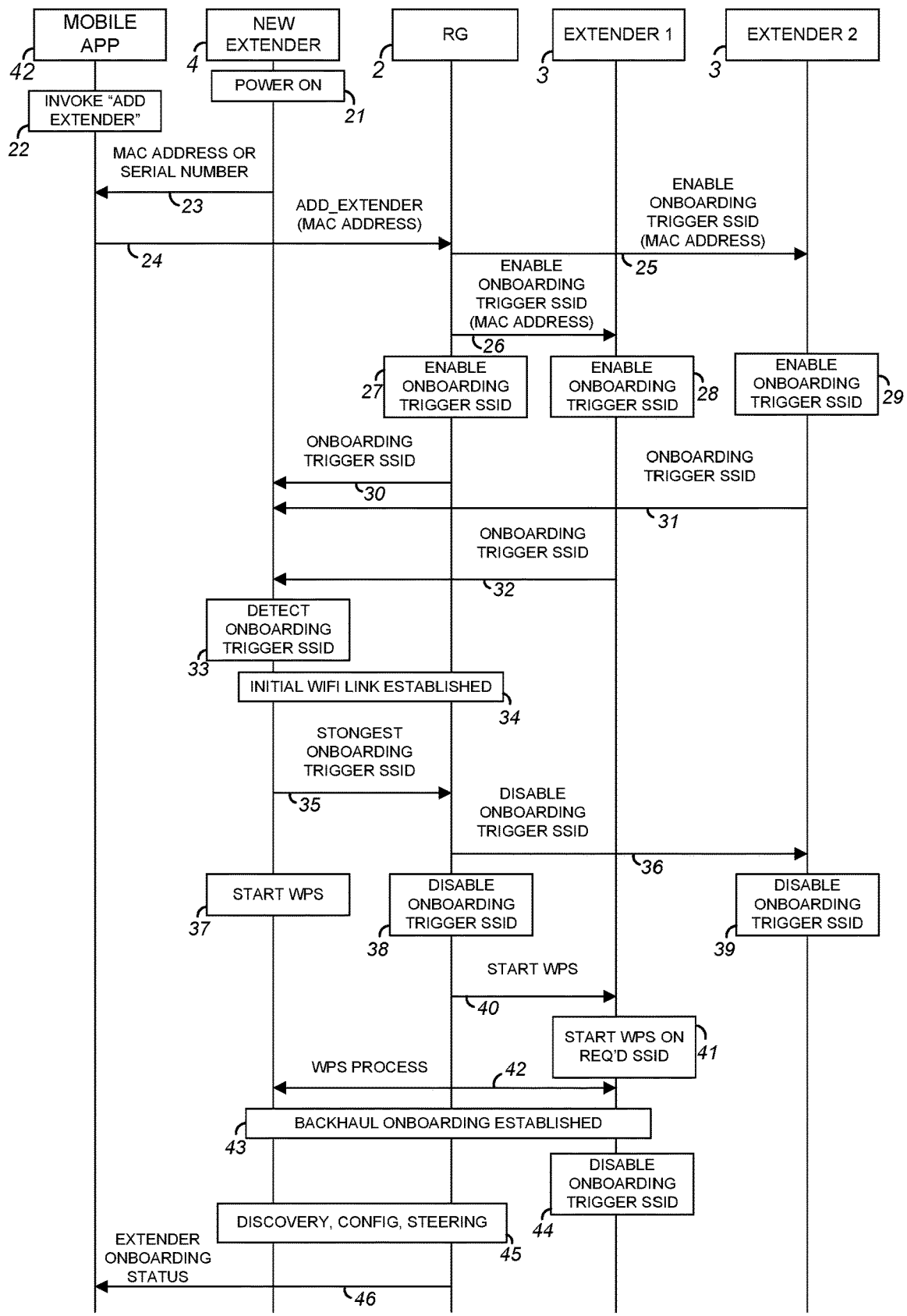
FIG. 4 illustrates a method for performing onboarding of a wireless extender in a wireless residential network according to an embodiment of the present disclosure.

FIG. 4 illustrates a method for performing onboarding of a wireless extender in a wireless residential network according to an embodiment of the present disclosure. The method in FIG. 4 illustrates onboarding of the new wireless extender 4 to the residential gateway 2 or to an existing wireless extender 4. Each of existing wireless extenders 4 were onboarded using, for example, the method described in FIG. 3.

Prior to onboarding of the new wireless extender 4, the mobile device 5 must be securely connected to the residential gateway 2, e.g., on front-haul (FH) service set identifier (SSID) (e.g. Data SSID) with password (PW) protection, using connection 10. Mobile devices 5 may also have an indirect connection to the residential gateway 2 via one of the existing extenders 3, 4 as they are all sharing the same fronthaul SSID. The user must have downloaded and activated the mobile application 42 needed for wireless onboarding operations. Additionally, the new wireless extender 4, the existing wireless extenders 3, and the residential gateway 2 include their respective onboarding software 25, 32. FIG. 4 differs from FIG. 3 in that FIG. 4 illustrates operations between the onboarding mobile application 42 of the mobile device 5, the onboarding software 32 of existing wireless extenders 4 and the new wireless extender 3, and onboarding software 25 of the residential network 2 when performing onboarding of the new wireless extender 4 to another existing wireless extender 4 (e.g., extender 1 instead of the residential gateway 2).

In step S21, the new wireless extender 4 is turned on using the user interface 29 and the power supply 28 of the new wireless extender 4. Upon activation of the new wireless extender 4, the onboarding mobile application 32 will continually scan for the presence of any transmitted On-Board-Trigger SSIDs from other devices in the wireless residential network. The On-Board-Trigger SSID is a unique unhidden SSID that includes part or all of the wireless extender's 4 unique identifier in an SSID name, which may include the MAC address or serial number of the new wireless extender 4.

In step S22, the user of the mobile device 5 invokes the adding or onboarding of the new wireless extender 4 by making a selection using, for example, the "Add Extender" service provided through the onboarding mobile application 42 (e.g., "Add Extender" selection) using the user interface 36. In step S23, the onboarding mobile application 42 instructs the user via the user interface 36 to scan the barcode or QR 35 attached to the new wireless extender 4. The data from the barcode or QR 35 includes a MAC address or serial number of the wireless extender 4.

The camera 40 can be used in combination with a scanning application stored in the memory 39 for scanning and obtaining the data from the barcode or QR 35 attached to the new wireless extender 4 (e.g., data connection 16). In step S24, the onboarding mobile application 42 uses the data obtained from the barcode or QR 35 attached to the new wireless extender 4 to generate a request for onboarding of the new wireless extender 4 and transmits the request to the residential gateway 2 using connection 10. The request transmitted from the onboarding mobile application 42, in step S24, includes the MAC address or the serial number of the new wireless extender 4.

Upon receiving the request from the onboarding mobile application 42 to initiate the onboarding operation, the onboarding software 25 of the residential gateway 2 signals (e.g., including the MAC address or the serial number of the new wireless extender 4) to the existing wireless extenders 3 (e.g., extender 1 and extender 2) to enable their On-Board-Trigger SSID beacon signals, in steps S25 and S26. In steps S27, S28, and S29, the residential gateway 2 and the existing wireless extenders 3 initiate a protected onboarding operation to generate and enable their respective On-Board-Trigger SSID beacon signals. In this case, the On-Board-Trigger SSID in each beacon signal will include the respective device's own MAC address as well as part or all of the new extender's unique identifier (e.g., if using the extender's MAC address which is: 0123456789AB, the unique onboarding SSID may be Onboard_89AB). In steps S30, S31, and S32, the residential gateway 2 and the existing wireless extenders 3 transmits their respective On-Board-Trigger SSID beacon signal to the new wireless extender 4 using connection 9.

The onboarding software 32 of the wireless extender 4 is activated (e.g., step S21) and is continually scanning for the presence of any transmitted unique On-Board-Trigger SSIDs from other devices in the wireless residential network. The scanning by the wireless extender 4 is accomplish by the onboarding software 32 through the use of scanning logic followed by a parsing operation to look for all or part of its MAC address or SN in any of the SSID results from the scan. The wireless extender 4 may need to run through several scans or scan SSID check iterations before detecting the On-Board-Trigger SSID. In step S33, the new wireless extender 4 detects the On-Board-Trigger SSID beacon signals from each of the residential gateway 2 and the existing wireless extenders 3 (e.g., extender 1 and extender 2) and determines the strongest On-Board-Trigger SSID beacon signal. In the exemplary method of FIG. 4, it is assumed that the closest existing wireless extender 3 (i.e., wireless extender 1) has the strongest On-Board-Trigger SSID beacon signal.

The new wireless extender 4 needs to report the results of the detection of the On-Board-Trigger SSIDs (e.g., the strongest On-Board-Trigger SSID beacon signal) to the residential gateway 2, which requires establishing an initial wireless link with the residential gateway over the onboarding trigger SSID, in step S34. The initial wireless link may span to the strongest extender (e.g., Extender 1), if there is too weak a link from the next extender to the residential gateway 2 (e.g., the residential gateway 2 is too far away).

To establish the initial wireless link with the residential gateway 2, the new wireless extender 4 can, for example, obtain an IP address from the residential gateway's DHCP server and use the residential gateway's DNS server 7 to determine the residential gateway's HTTPS sever address for establishing the initial wireless link and communications with the residential gateway 2 (e.g., for pre-provisioned residential gateway HTTPS server URL). In step S35, the new wireless extender 4 transmits to the residential gateway 2, which of detected On-Board-Trigger SSID beacon signals from each of the residential gateway 2 and the existing wireless extenders 3 is the strongest On-Board-Trigger SSID beacon signal (e.g., in this case, extender 1). At this point, the onboarding software 32 of the new wireless extender 4 can also terminate its scanning for the On-Board Trigger SSID.

Upon receiving the detection results from the new wireless extender 4 (i.e., in step S35), the residential gateway 2 transmits a signal to disable the On-Board-Trigger SSID beacon signal transmission from the other existing wireless extender 3 (e.g., extender 2) not having the strongest onboarding trigger SSID beacon signal, in step S36. In step S37, the onboarding software 32 of the new wireless extender 4 uses the strongest On-Board Trigger SSID beacon signal (e.g., in this case, from extender 1) to initiate a standard WPS operation for establishing the wireless backhaul link between the new wireless extender 4 and existing wireless extender 3 with the strongest On-Board Trigger SSID beacon signal (e.g., in this case, from extender 1). In step S38, the residential gateway 2 disables its own On-Board-Trigger SSID beacon signal transmission and, in step S39, the other existing wireless extender 3 (e.g., extender 2) not having the strongest onboarding trigger SSID beacon signal also disables its own On-Board-Trigger SSID beacon signal transmission.

In step S40, the residential gateway 2 transmits a signal to the existing wireless extender 3 (i.e., wireless extender 1) having the strongest detected On-Board-Trigger SSID beacon signal using connection 9 to initiate a WPS operation and, in step S41, the existing wireless extender 3 (i.e., wireless extender 1) initiates the WPS operation. Both the new wireless extender 4 and the existing wireless extender 3 (i.e., wireless extender 1) use their respective SSIDs to initiating the WPS operation for establishing the backhaul onboarding link in step S42. In step S43, the new wireless extender 4 and the existing wireless extender 3 (i.e., wireless extender 1) establish the backhaul link to the wireless residential network.

Once the backhaul link between the new wireless extender 4 and the existing wireless extender 3 (i.e., wireless extender 1) is established, the existing wireless extender 3 (e.g., extender 1) disables its own On-Board-Trigger SSID beacon signal transmission, in step S44. In step S45, the onboarding software 25 of the residential gateway 32 and the onboarding software of the wireless extenders 3, 4 perform operations to configure the backhaul SSID on the new wireless extender 4 followed by additional configuring and steering operations, in step S45. The operations to configure the backhaul SSID and steering operations will occur through the existing extender 3 (e.g., extender 1). In step S46, the onboarding software 25 of the residential gateway 2 transmits an extender onboarding status message back to the mobile device 5 using connection 10. For example, the extender onboarding status message may include a "success" response back to the mobile application 42 that the new wireless extender 4 has been added to the wireless residential network, and the onboarding mobile application 42 informs the user via the user interface 36 of the mobile device 5. Alternatively, if the WPS operation fails, the onboarding mobile application 25 of the residential gateway 2 provides an "error" response back to the onboarding mobile application 42.

The above description of onboarding of a new wireless extender of the present disclosure allows for easy onboarding a new extender to a residential network while avoiding the need for BLE support for home network devices, and the requirement to physical push buttons on home network devices. The user merely scans a bar code or QR of new extender, no WPS buttons need to be pushed, and only minor wireless extender support is required. Additionally, the unique On-Board-Trigger SSID makes it difficult for a hacker device to impersonate the residential gateway, which mitigate a rouge device successfully capturing a wireless extender.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for onboarding a wireless extender in a wireless residential network, the wireless residential network including at least a residential gateway and a mobile device connected to the residential gateway, the method comprising:
   obtaining, using the mobile device, a media access point (MAC) address or serial number from the wireless extender;
   transmitting, using the mobile device, a request to the residential gateway to add the wireless extender to the wireless residential network, the request including the MAC address or serial number obtained from the wireless extender;
   initiating, using the residential gateway, a protected onboarding operation that includes transmitting a unique onboarding trigger SSID to the wireless extender, the unique onboarding trigger SSID including an identifier with part or all of the MAC address or the serial number from the wireless extender;
   detecting, using the wireless extender, the unique onboarding trigger SSID, the unique onboarding trigger SSID being provided as a signal to initiate a standard wireless protected setup (WPS) operation on the wireless extender; and
   initiating, using the wireless extender, the standard WPS operation for establishing a wireless backhaul link between the wireless residential network and the wireless extender.

2. The method according to claim 1, wherein the obtaining of the MAC address or serial number from the wireless extender includes scanning a quick response code or barcode on the wireless extender.

3. The method according to claim 1, wherein the standard WPS operation for establishing the wireless backhaul link is between the residential gateway and the wireless extender.

4. The method according to claim 1, further comprising:
   disabling, using the residential gateway, the unique onboarding trigger SSID on the residential gateway after the standard WPS operation for establishing a wireless backhaul link is completed.

5. The method according to claim 1, further comprising:
   transmitting, using the residential gateway, a response to the mobile device indicating an onboarding status of the wireless extender, the onboarding status indicating success or failure to add the wireless extender to the wireless residential network.

6. The method according to claim 1, further comprising:
transmitting, using the residential gateway, the unique onboarding trigger SSID to one or more existing wireless extenders in the wireless residential network;
transmitting, using each of the one or more existing wireless extenders, a unique onboarding trigger SSID beacon signal to the wireless extender, each of the unique onboarding trigger SSID beacon signals including part or all of the MAC address or the serial number of the wireless extender and a MAC address and a serial number of a respective existing wireless extender transmitting the unique onboarding trigger SSID beacon signal; and
detecting, using the wireless extender, a strongest signal received among the residential gateway and the one or more existing wireless extenders based on the unique onboarding trigger SSID and the unique onboarding trigger SSID beacon signals,
wherein the wireless extender and residential gateway or an existing wireless extender having the strongest signal among the one or more existing wireless extenders initiate the standard WPS operation for establishing the wireless backhaul link between the wireless residential network and the wireless extender.

7. The method according to claim 6, further comprising:
reporting, using the wireless extender, which among the one or more existing wireless extenders and the residential gateway has the strongest signal to the residential gateway; and
transmitting, using the residential gateway, a signal to the existing wireless extender having the strongest signal to initiate the standard WPS operation for establishing the wireless backhaul link between the wireless residential network and the wireless extender.

8. The method according to claim 6, further comprising:
using the residential gateway,
disabling the unique onboarding trigger SSID in the residential gateway; and
transmitting to the one or more existing wireless extenders a signal to disable their respective unique onboarding trigger SSID beacon signals after the standard WPS operation for establishing a wireless backhaul link is completed.

9. A non-transitory computer-readable recording medium in each of a residential gateway, a wireless extender to be added to a wireless residential network, and a mobile device for performing onboarding of the wireless extender in wireless residential network, each non-transitory computer-readable recording medium storing one or more onboarding programs which when executed by a respective processor performs steps comprising:
obtaining, using the mobile device, a media access point (MAC) address or serial number from the wireless extender;
transmitting, using the mobile device, a request to the residential gateway to add the wireless extender to the wireless residential network, the request including the MAC address or serial number obtained from the wireless extender;
initiating, using the residential gateway, a protected onboarding operation that includes transmitting a unique onboarding trigger SSID to the wireless extender, the unique onboarding trigger SSID including an identifier with part or all of the MAC address or the serial number from the wireless extender;
detecting, using the wireless extender, the unique onboarding trigger SSID, the unique onboarding trigger SSID being provided as a signal to initiate a standard wireless protected setup (WPS) operation on the wireless extender; and
initiating, using the wireless extender, the standard WPS operation for establishing a wireless backhaul link between the wireless residential network and the wireless extender.

10. The non-transitory computer-readable recording medium according to claim 9, wherein the standard WPS operation for establishing the wireless backhaul link is between the residential gateway and the wireless extender.

11. The non-transitory computer-readable recording medium according to claim 9, further comprising:
disabling, using the residential gateway, the unique onboarding trigger SSID on the residential gateway after the standard WPS operation for establishing a wireless backhaul link is completed.

12. The non-transitory computer-readable recording medium according to claim 9, further comprising:
transmitting, using the residential gateway, a response to the mobile device indicating an onboarding status of the wireless extender, the onboarding status indicating success or failure to add the wireless extender to the wireless residential network.

13. The non-transitory computer-readable recording medium according to claim 9, further comprising a non-transitory computer-readable recording medium in each of one or more existing wireless extenders in the wireless residential network which when executed by a respective processor performs steps:
transmitting, using each of the one or more wireless extenders, a unique onboarding trigger SSID beacon signal to the wireless extender, each of the unique onboarding trigger SSID beacon signals including part or all of the MAC address or the serial number of the wireless extender and a MAC address and a serial number of a respective existing wireless extender transmitting the unique onboarding trigger SSID beacon signal; and
detecting, using the wireless extender, a strongest signal received among the residential gateway and the one or more existing wireless extenders based on the unique onboarding trigger SSID and the unique onboarding trigger SSID beacon signals,
wherein the wireless extender and residential gateway or an existing wireless extender having the strongest signal among the one or more existing wireless extenders initiate the standard WPS operation for establishing the wireless backhaul link between the wireless residential network and the wireless extender.

14. The non-transitory computer-readable recording medium according to claim 13, further comprising:
reporting, using the wireless extender, which among the one or more existing wireless extenders and the residential gateway has the strongest signal to the residential gateway; and
transmitting, using the residential gateway, a signal to the existing wireless extender having the strongest signal to initiate the standard WPS operation for establishing the wireless backhaul link between the wireless residential network and the wireless extender.

15. The non-transitory computer-readable recording medium according to claim 13, further comprising:
using the residential gateway,
disabling the unique onboarding trigger SSID in the residential gateway; and transmitting to the one or more existing wireless extenders a signal to disable their respective unique onboarding trigger SSID beacon signals after the standard WPS operation for establishing a wireless backhaul link is completed.

16. A system for onboarding a wireless extender in a wireless residential network, the system comprising:
a mobile device including a user interface, a camera, at least one hardware processor, a non-transitory memory storing onboarding software, and a first network interface configured to establish a connection to the wireless residential network using a first network connection;
a residential gateway including at least one hardware processor, a non-transitory memory storing onboarding software, and a network interface configured to establish a connection to the mobile device using the first network connection and configured to establish a connection to the wireless residential network using a second network connection; and
a wireless extender to be added to the wireless residential network including a least one hardware processor, a non-transitory memory storing onboarding software, and a network interface for connecting to the residential gateway using the second network connection,
wherein each of the mobile device, the residential gateway, and the wireless extender executes their respective onboarding software using their respective hardware processors to perform the following:
the mobile device obtains, using the camera or the user interface, a media access point (MAC) address or serial number from the wireless extender, and transmits using the first network connection a request to the residential gateway to add the wireless extender to the wireless residential network, the request including the MAC address or serial number obtained from the wireless extender;
the residential gateway initiates a protected onboarding operation that includes transmitting a unique onboarding trigger SSID to the wireless extender using the second network connection, the unique onboarding trigger SSID including an identifier with part or all of the MAC address or the serial number from the wireless extender;
the wireless extender detects the unique onboarding trigger SSID, the unique onboarding trigger SSID being provided as a signal to initiate a standard wireless protected setup (WPS) operation on the wireless extender; and
the wireless extender initiates the standard WPS operation for establishing a wireless backhaul link between the wireless residential network and the wireless extender using the second network connection.

17. The system according to claim 16, wherein the MAC address or serial number from the wireless extender is obtained by scanning a quick response code or barcode on the wireless extender using the camera.

18. The system according to claim 16, further comprising:
one or more existing wireless extenders in the wireless residential network, each of the one or more wireless extenders including a least one hardware processor, a non-transitory memory storing onboarding software, and a network interface for connecting to the residential gateway using the second network connection and to wireless extender using a third network connection
wherein each of the one or more existing wireless extenders execute their respective onboarding software using their respective hardware processors to perform the following:
each of the one or more existing wireless extenders transmits using a third network connection a unique onboarding trigger SSID beacon signal to the wireless extender, each of the unique onboarding trigger SSID beacon signals including part or all of the MAC address or the serial number of the wireless extender and a MAC address and a serial number of a respective existing wireless extender among the one or more existing wireless extenders transmitting the unique onboarding trigger SSID beacon signal; and
the wireless extender detects a strongest signal received among the residential gateway and the one or more existing wireless extenders based on the unique onboarding trigger SSID and the unique onboarding trigger SSID beacon signals,
wherein the wireless extender and residential gateway or an existing wireless extender having the strongest signal among the one or more existing wireless extenders initiate the standard WPS operation for establishing the wireless backhaul link between the wireless residential network and the wireless extender.

19. The system according to claim 18, wherein each of the residential gateway and the wireless extender execute their respective onboarding software using their respective hardware processors to further perform the following:
the wireless extender reports using the second network connection which among the one or more existing wireless extenders and the residential gateway has the strongest signal to the residential gateway; and
the residential gateway transmits using the second network connection a signal to the existing wireless extender having the strongest signal to initiate the standard WPS operation for establishing the wireless backhaul link between the wireless residential network and the wireless extender.

20. The system according to claim 19, wherein the residential gateway executes the onboarding software using the respective hardware processor to perform the following further operations:
the residential gateway disables the unique onboarding trigger SSID in the residential gateway; and
transmits a signal to the one or more existing wireless extenders using the second network connection to disable their respective unique onboarding trigger SSID beacon signals after the standard WPS operation for establishing a wireless backhaul link is completed.

21. An apparatus for onboarding in a wireless residential network comprising:
at least one hardware processor;
a non-transitory memory storing onboarding software;
a network interface for connecting to the wireless residential network using a network connection,
wherein the at least one hardware processor executes the onboarding software to perform the following:
detect a unique onboarding trigger SSID received using the network connection, the unique onboarding trigger SSID including an identifier with part or all of the MAC address or the serial number of the apparatus and being provided as a signal to initiate a standard wireless protected setup (WPS) operation;
initiate the standard WPS operation for establishing a wireless backhaul link to the wireless residential network; and establish a wireless backhaul link with the wireless residential network.

22. The apparatus according to claim 21, wherein the apparatus is a wireless extender and the wireless backhaul link established is with a residential gateway in the wireless residential network.

23. The apparatus according to claim 21, wherein the apparatus is a wireless extender and the wireless backhaul link established is with an existing wireless extender in the wireless residential network having a strongest unique onboarding trigger SSID beacon signal.

* * * * *